US012760685B2

(12) United States Patent
Sheridan

(10) Patent No.: US 12,760,685 B2
(45) **Date of Patent: *Oct. 13, 2026**

(54) GAS TURBINE ENGINE WITH FRONT SUPPORT ARRANGEMENT

(71) Applicant: RTX CORPORATION, Farmington, CT (US)

(72) Inventor: William G. Sheridan, Southington, CT (US)

(73) Assignee: RTX CORPORATION, Farmington, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 19/280,235

(22) Filed: Jul. 25, 2025

(65) Prior Publication Data

US 2025/0354522 A1 Nov. 20, 2025

Related U.S. Application Data

(63) Continuation of application No. 18/929,956, filed on Oct. 29, 2024, now Pat. No. 12,392,294, which is a continuation of application No. 18/107,671, filed on Feb. 9, 2023, now Pat. No. 12,158,110, which is a continuation of application No. 17/218,369, filed on Mar. 31, 2021, now Pat. No. 11,578,665, which is a continuation of application No. 16/203,088, filed on Nov. 28, 2018, now Pat. No. 11,008,947, which is a continuation of application No. 14/633,244, filed on Feb. 27, 2015, now Pat. No. 10,280,843.

(60) Provisional application No. 61/949,331, filed on Mar. 7, 2014.

(51) Int. Cl.

| | |
|---|---|
| ***F02C 7/36*** | (2006.01) |
| ***F01D 5/02*** | (2006.01) |
| ***F01D 15/12*** | (2006.01) |
| ***F01D 25/16*** | (2006.01) |
| ***F02C 3/04*** | (2006.01) |
| ***F02C 3/107*** | (2006.01) |
| ***F02C 7/06*** | (2006.01) |

(52) U.S. Cl.

CPC ................. *F02C 7/36* (2013.01); *F01D 5/02* (2013.01); *F01D 15/12* (2013.01); *F01D 25/16* (2013.01); *F01D 25/162* (2013.01); *F02C 3/04* (2013.01); *F02C 3/107* (2013.01); *F02C 7/06* (2013.01); *F05D 2220/32* (2013.01); *F05D 2230/60* (2013.01); *F05D 2260/40311* (2013.01)

(58) Field of Classification Search

CPC .... F02C 7/36; F02C 7/06; F02C 3/107; F02C 3/04; F01D 15/12; F01D 25/16; F01D 25/162; F05D 2260/40311

See application file for complete search history.

*Primary Examiner* — Steven M Sutherland

(74) *Attorney, Agent, or Firm* — Carlson, Gaskey & Olds, P.C.

(57) ABSTRACT

A gas turbine engine may include a propulsor section including a propulsor having propulsor blades extending from a propulsor hub. A speed reduction device interconnects a turbine and a propulsor shaft that drives the propulsor. Bearings are positioned on opposite sides of the speed reduction device. A propulsor drive gear module is also disclosed.

20 Claims, 3 Drawing Sheets

GAS TURBINE ENGINE WITH FRONT SUPPORT ARRANGEMENT

CROSS-REFERENCE TO RELATED APPLICATIONS

This disclosure is a continuation of U.S. application Ser. No. 18/929,956 filed Oct. 29, 2024, which is a continuation of U.S. application Ser. No. 18/107,671 filed Feb. 9, 2023, which is a continuation of U.S. application Ser. No. 17/218,369 filed Mar. 31, 2021, which is a continuation of U.S. application Ser. No. 16/203,088 filed Nov. 28, 2018, which is a continuation of U.S. application Ser. No. 14/633,244 filed on Feb. 27, 2015, now U.S. Pat. No. 10,280,843 issued May 7, 2019, which claims priority to U.S. Provisional Application No. 61/949,331, which was filed on Mar. 7, 2014 and is incorporated herein by reference.

BACKGROUND

A gas turbine engine typically includes a fan section, a compressor section, a combustor section and a turbine section. Air entering the compressor section is compressed and delivered into the combustion section where it is mixed with fuel and ignited to generate a high-energy exhaust gas flow. The high-energy exhaust gas flow expands through the turbine section to drive the compressor and the fan section. The compressor section typically includes low and high pressure compressors, and the turbine section includes low and high pressure turbines.

A speed reduction device such as an epicyclical gear assembly may be utilized to drive the fan section such that the fan section may rotate at a speed different than the turbine section so as to increase the overall propulsive efficiency of the engine. In such engine architectures, a shaft driven by one of the turbine sections provides an input to the epicyclical gear assembly that drives the fan section at a reduced speed such that both the turbine section and the fan section can rotate at closer to optimal speeds.

The epicyclical gear assembly includes bearings that support rotation of gears. Loads incurred during operation can disrupt a desired relative alignment between gears and therefore the gear assembly may be supported on structures designed to accommodate such loads.

Although geared architectures improve propulsive efficiency, they present different challenges that can reduce any efficiency gains. Accordingly, turbine engine manufacturers continue to seek further improvements to engine performance including improvements to thermal, transfer and propulsive efficiencies.

SUMMARY

In one exemplary embodiment, a gas turbine engine includes a nacelle, and a bypass flow path in a bypass duct within the nacelle of the turbofan engine. A fan section includes a fan with fan blades. The fan section drives air along the bypass flow path. A fan shaft drives a fan that has fan blades and the fan rotates about a central longitudinal axis of the turbofan engine. A speed reduction device includes an epicyclic gear system. A turbine section is connected to the fan section through the speed reduction device and the turbine section rotates about the central longitudinal axis. A first fan bearing for supporting rotation of the fan hub is located axially forward of the speed reduction device. A second fan bearing for supporting rotation of the fan hub is located axially aft of the speed reduction device. A first outer race of the first fan bearing is fixed relative to the fan hub.

In a further embodiment of any of the above, the second fan bearing includes an outer race. The outer race of the first fan bearing and the outer race of the second fan bearing are fixed relative to the fan hub and rotate with the fan hub in the same direction.

In a further embodiment of any of the above, an inner race of the first fan bearing is fixed from rotation relative to an engine static structure. An inner race of the second fan bearing is fixed from rotation relative to the engine static structure.

In a further embodiment of any of the above, the epicyclic gear system includes a sun gear, star gears, a ring gear mechanically attached to the fan section, and a carrier. The carrier is fixed from rotation relative to the engine static structure.

In a further embodiment of any of the above, the first fan bearing and the second fan bearing include at least one of roller bearings, ball bearings, or tapered bearings. Each of the star gears include a star gear bearing.

In a further embodiment of any of the above, the carrier includes multiple flexible posts for mounting each of the star gears and the star gear bearing.

In a further embodiment of any of the above, the first fan bearing is at least partially axially aligned with a fan blade of the fan section.

In a further embodiment of any of the above, a carrier is fixed from rotation relative to an engine static structure without a static flexible mount.

In a further embodiment of any of the above, an inner race of the first fan bearing is fixed from rotation relative to a carrier. The carrier is fixed from rotation relative to an engine static structure.

In a further embodiment of any of the above, a high pressure compressor with a compression ratio of at least 20:1 and a fan bypass ratio greater than 10.

In a further embodiment of any of the above, a compressor section is configured to rotate with the fan section. The compressor section includes a five stage low pressure compressor with a compression ratio of at least 2:1.

In a further embodiment of any of the above, a rotating compartment wall is configured to rotate with the compressor section and form a seal with an engine static structure.

In a further embodiment of any of the above, the speed reduction device is located radially inward from a first compressor. The speed reduction device is axially aligned with the first compressor.

In another exemplary embodiment, a fan drive gear module includes a sun gear and a multitude of intermediate gears surrounding the sun gear. A carrier supports the multitude of intermediate gears. The carrier is configured to support a fan hub with a first fan bearing located on a first side of the carrier and a second fan bearing located on a second opposite side of the carrier. The carrier is configured to be fixed from rotation relative to an engine static structure without a static flexible mount. An outer race of the first fan bearing and an outer race of the second fan bearing are fixed relative to the fan hub and rotate with the fan hub in the same direction.

In a further embodiment of any of the above, an inner race of the first fan bearing is fixed from rotation relative to a carrier. The carrier is fixed from rotation relative to the engine static structure.

In a further embodiment of any of the above, each of the multitude of intermediate gears include an intermediate gear bearing. The carrier includes multiple flexible posts for mounting each of the multitude of intermediate gears and the intermediate gear bearing.

In a further embodiment of any of the above, a ring gear is fixed relative to the fan hub and the first fan bearing and the second fan bearing include at least one of roller bearings, ball bearings, or tapered bearings.

In another exemplary embodiment, a method of designing a gas turbine engine includes coupling a speed reduction device between a fan hub and a low pressure turbine drive shaft. A first fan bearing is positioned axially forward of the speed reduction device. An outer race of the first fan bearing is fixed relative to the fan hub and rotates with the fan hub relative to an engine static structure. A second fan bearing is positioned axially aft of the speed reduction device. An outer race of the second fan bearing is fixed relative to the fan hub and rotates in the same rotational direction as the outer race of the first fan bearing.

In a further embodiment of any of the above, an inner race of the first fan bearing and an inner race of the second fan bearing is positioned fixed to a carrier and fixed from rotation relative to the engine static structure.

In a further embodiment of any of the above, a ring gear of the speed reduction device relative to the fan hub is fixed to allow the ring gear to rotate with the fan hub. The first fan bearing and the second fan bearing include at least one of roller bearings, ball bearings, or tapered bearings.

The various features and advantages of this disclosure will become apparent to those skilled in the art from the following detailed description. The drawings that accompany the detailed description can be briefly described as follows.

DETAILED DESCRIPTION

Figure 1:
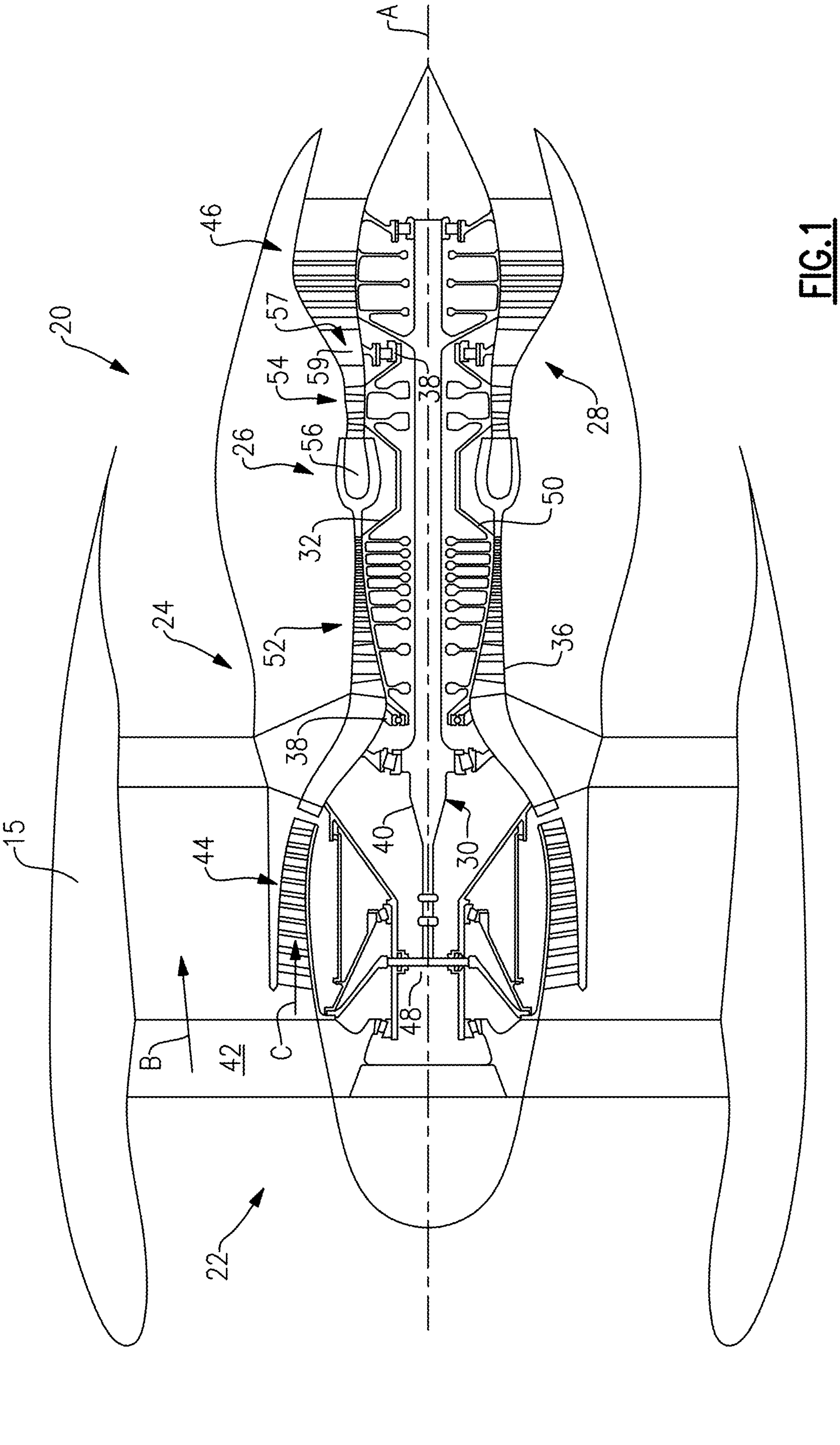
FIG. 1 is a schematic view of an example gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flow path B in a bypass duct defined within a nacelle 15, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine 20 between the high pressure compressor 52 and the high pressure turbine 54. A mid-turbine frame 57 of the engine static structure 36 is arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 with a compression ratio of at least 2:1 then the high pressure compressor 52, mixed and burned with fuel in the combustor 56, then expanded over the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 fect. The flight condition of 0.8 Mach and 35,000 ft (10,668 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. “Low fan pressure ratio” is the pressure ratio across the fan blade alone, without a Fan Exit Guide Vane (“FEGV”) system. The low fan pressure ratio as disclosed herein according to one non-limiting embodiment is less than about 1.45. “Low corrected fan tip speed” is the actual fan tip speed in ft/sec divided by an industry standard temperature correction of $[(\text{Tram } ^\circ \text{R})/(518.7^\circ \text{R})]^{0.5}$. The “Low corrected fan tip speed” as disclosed herein according to one non-limiting embodiment is less than about 1150 ft/second (350.5 meters/second).

Figure 2:
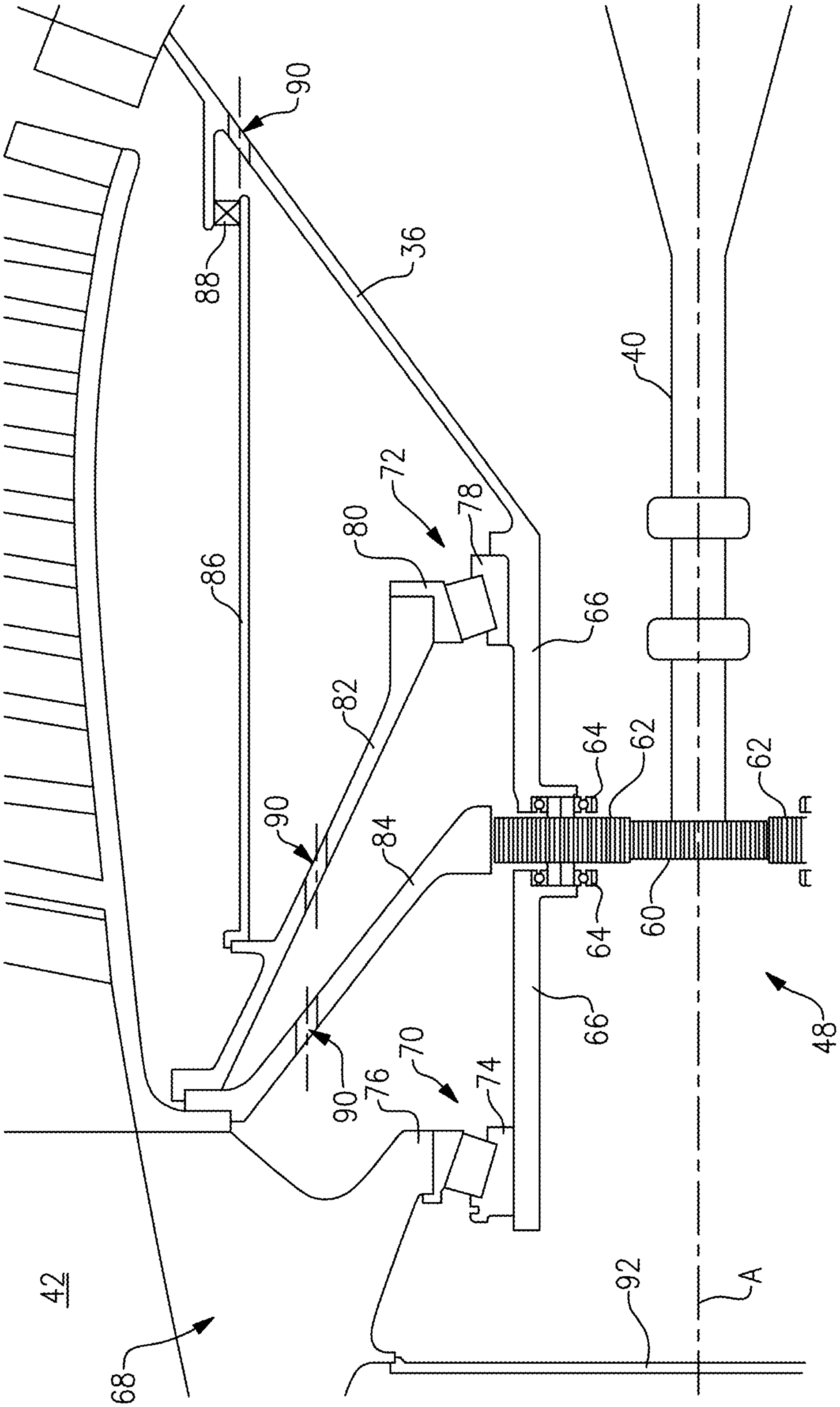
FIG. 2 is a schematic view of an example geared architecture.

FIG. 2 illustrates the inner shaft 40 driving the geared architecture 48 to turn the fan 42 and the low pressure compressor 44 together at the same rotational speed. The inner shaft 40 is connected with a sun gear 60 in the geared architecture 48. The sun gear 60 is surrounded by star gears 62 mounted on star gear bearing assemblies 64 attached to a static carrier 66. The static carrier 66 allows the star gears 62 to rotate around an axis of each star gear 62 but not around and engine axis A. The static carrier 66 is fixed relative to the engine static structure 36 on the gas turbine engine 20.

The geared architecture 48 is located radially inward and axially aligned with the low pressure compressor 44 to shorten the overall length of the gas turbine engine 20.

A fan hub 68 is supported by a forward fan bearing 70 and an aft fan bearing 72. The forward fan bearing 70 includes an inner race 74 fixed to the static carrier 66 and an outer race 76 fixed to the fan hub 68. The forward fan bearing 70 supports radial and thrust loads from a forward end of the fan hub 68.

The aft fan bearing 72 includes an inner race 78 attached to the static carrier 66, which is connected with the engine static structure 36, and an outer race 80 is attached to a rotating aft support 82. The aft fan bearing 72 supports an aft end of the fan hub 68 and carries radial loads from the fan 42.

A rotatable ring gear 84 turns the fan hub 68 and the low pressure compressor 44 at the same rotational speed. A rotating compartment wall 86 extends from the rotating aft support 82 and is sealed against the engine static structure 36 with an oil seal 88.

Scavenged oil passes through holes 90 extending through the ring gear 84, the rotating aft support 82, and the engine static structure 36 to direct oil towards the forward and aft fan bearing 70 and 72 and the geared architecture 48. A rotating cover 92 aids in retaining and directing the oil towards the forward fan bearing 70, the aft fan bearing 72, and the geared architecture 48 and to prevent the need for carbon seals.

Figure 3:
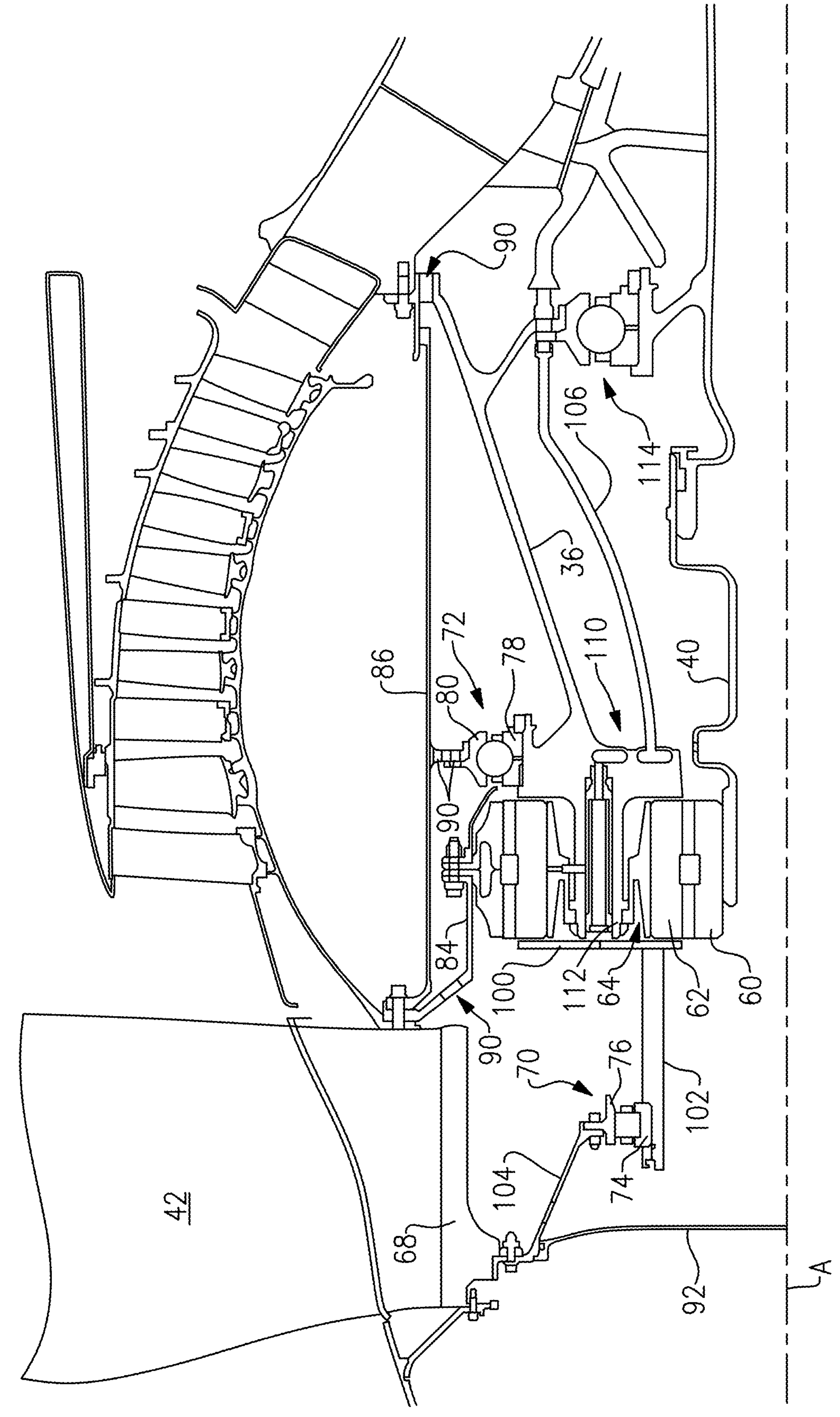
FIG. 3 is a schematic view of another example geared architecture.

FIG. 3 illustrates another example geared architecture 148. The geared architecture 148 is similar to the geared architecture 48 shown in FIG. 2 except where shown in FIG. 3 or described below.

A static carrier 110 includes an oil baffle 100 extending from a forward end and a cylindrical support 102 for supporting the forward fan bearing 70. An oil feed tube 106 supplies oil to the static carrier 110 and the rest of geared architecture 148. A multitude of flexible shafts 112 extend from the static carrier 110 to support the star gears 62 and the respective star gear bearing assemblies 64. The flexibility of the shafts 112 support torsional loads from the star gears 62 and star gear bearing assemblies 64 and allow the star gears 62 to be isolated from the engine static structure 36 such that a static flexible mount is not necessary to mount the geared architecture 148.

The forward fan bearing 70 in this example includes a roller bearing with the inner race 74 mounted to the cylindrical support 102 and the outer race 76 rotatably attached to the fan hub 68 through a hub support 104. Although a roller bearing is illustrated in this example for the forward fan bearing 70, a ball bearing or a tapered bearing could also be utilized.

The aft fan bearing 72, such as a ball bearing, is mounted on an aft side of the geared architecture 148 opposite from the forward bearing 70. Although a ball bearing is illustrated in this example for the aft fan bearing 72, a roller bearing or a tapered bearing could also be utilized.

The forward fan bearing 70 and the aft fan bearing 72 straddle the geared architecture 148 to greatly reduce misalignment imparted on the geared architecture 148. This eliminates the need for a flexible coupling on the geared architecture 148 to combat misalignment forces acting on the gears.

An inner shaft bearing 114 attached to the engine static structure 36 supports a forward end of the inner shaft 40 and carries both radial and thrust loads. Since the fan 42 imparts a forward thrust load and low pressure turbine 46 imparts an aft thrust load on the inner shaft 40, the opposing loads are generally cancelled out by the aft fan bearing 72 and the inner shaft bearing 114 both being attached to the engine static structure 36.

The gas turbine engine 20 is designed by attaching the geared architecture 48 or 148 device to the fan hub 68 and the inner shaft 40. The forward fan bearing 70 is positioned forward of the geared architecture 48 or 148 with the first outer race 76 connected to the fan hub 68. The aft fan bearing 72 is positioned aft of the geared architecture 48 or 148. The inner race 74 and the inner race 78 are attached to the static carrier (66 or 110). The ring gear 85 from the geared architecture 48 or 148 is connected to the fan hub 68.

The preceding description is exemplary rather than limiting in nature. Variations and modifications to the disclosed examples may become apparent to those skilled in the art that do not necessarily depart from the essence of this disclosure. The scope of legal protection given to this disclosure can only be determined by studying the following claims.

What is claimed is:

1. A gas turbine engine comprising:

a propulsor section including a propulsor having propulsor blades extending from a propulsor hub, wherein the propulsor is rotatable about a longitudinal axis;

a propulsor shaft that drives the propulsor;

a compressor section including a first compressor and a second compressor;

a speed reduction device including an epicyclic gear system, wherein the epicyclic gear system includes a sun gear, a ring gear, a carrier and a plurality of intermediate gears supported on respective support members of the carrier, wherein the support members extend from the carrier to respective free ends;

a turbine section including a first turbine and a second turbine, wherein the first turbine drives the second turbine, and the speed reduction device interconnects the second turbine and the propulsor shaft;

a first bearing that supports rotation of the propulsor hub; and a second bearing that supports rotation of the propulsor hub, wherein the first and second bearings are positioned on opposite sides of the speed reduction device with respect to the longitudinal axis;

wherein an outer race of the first bearing and an outer race of the second bearing are rotatable with the propulsor hub.

2. The gas turbine engine of claim 1, wherein the first compressor includes a plurality of stages.

3. The gas turbine engine of claim 2, wherein the propulsor and the first compressor are rotatable together at the same rotational speed.

4. The gas turbine engine of claim 3, wherein the ring gear is adapted to turn the propulsor hub and the first compressor at the same rotational speed.

5. The gas turbine engine of claim 2, wherein the epicyclic gear system is radially inward and axially aligned with the first compressor with respect to the longitudinal axis.

6. The gas turbine engine of claim 1, wherein the outer race of the first bearing and the outer race of the second bearing are rotatable with the propulsor hub in the same direction and at the same rotational speed.

7. The gas turbine engine of claim 1, wherein the support members are posts.

8. The gas turbine engine of claim 7, wherein the intermediate gears are mounted on respective bearing assemblies coupled to the carrier.

9. The gas turbine engine of claim 8, wherein the posts are flexible and are adapted to support torsional loads from the intermediate gears and the bearing assemblies.

10. The gas turbine engine of claim 1, further comprising:
an oil feed tube fluidly coupled to the carrier.

11. The gas turbine engine of claim 1, further comprising:
an oil baffle extending from a forward end of the carrier, wherein the oil baffle is adjacent to the free ends of the support members.

12. The gas turbine engine of claim 1, wherein the carrier is fixed from rotation relative to an engine static structure.

13. The gas turbine engine of claim 12, wherein the first bearing includes an inner race, the second bearing includes an inner race, and the inner races are fixed from rotation relative to the engine static structure.

14. The gas turbine engine of claim 1, further comprising:
a compartment wall that is rotatable with the first compressor and forms a seal with an engine static structure.

15. The gas turbine engine of claim 1, wherein:
the propulsor is a fan, and an outer housing surrounds the fan to establish a bypass flow path.

16. A propulsor drive gear module for a gas turbine engine, comprising:
a sun gear;
a ring gear;
a plurality of intermediate gears surrounding the sun gear; and
a carrier including a plurality of support members that support the respective intermediate gears, wherein the carrier includes first and second bearings on opposite sides of the carrier that are adapted to support a propulsor hub, the carrier is adapted to be fixed from rotation relative to an engine static structure, and the support members extend from the carrier at respective proximal ends to respective distal free ends;
wherein the first bearing includes an inner race and an outer race, the outer race is adapted to be fixed relative to the propulsor hub such that the outer race is rotatable with the propulsor hub in the same direction and at the same rotation speed, the inner race of the first bearing is fixed from rotation relative to the carrier, the carrier is adapted to be fixed from rotation relative to the engine static structure, and an outer race of the second bearing is adapted to be fixed relative to the propulsor hub.

17. The propulsor drive gear module of claim 16, wherein the intermediate gears are mounted on respective intermediate gear bearings, and the support members are adapted to support the respective intermediate gears and the respective intermediate gear bearings.

18. The propulsor drive gear module of claim 16, further comprising:
an oil baffle extending from a forward end of the carrier adjacent the distal free ends of the support members.

19. The propulsor drive gear module of claim 16, wherein the ring gear is adapted to be fixed relative to the propulsor hub.

20. The propulsor drive gear module of claim 16, wherein the inner races are disposed along and axially aligned with an outer periphery of the carrier with respect to a longitudinal axis.

* * * * *